United States Patent [19]

Scott et al.

[11] Patent Number: 4,817,895

[45] Date of Patent: Apr. 4, 1989

[54] AEROBRAKING ORBITAL TRANSFER VEHICLE

[75] Inventors: Carl D. Scott, Friendswood; Kornel Nagy; Barney B. Roberts, both of Houston; Robert C. Ried, Friendswood; Kenneth R. Kroll, Houston; Joe Gamble, Friendswood, all of Tex.

[73] Assignee: The United States of America as represented by the Administrator of the National Aeronautics and Space Administration, Washington, D.C.

[21] Appl. No.: 110,060

[22] Filed: Oct. 14, 1987

Related U.S. Application Data

[63] Continuation of Ser. No. 746,162, Jun. 18, 1985, abandoned.

[51] Int. Cl.$^4$ ................................................ B64G 1/24
[52] U.S. Cl. ................................ 244/138 R; 244/160; 244/164
[58] Field of Search ................... 244/158 R, 160, 161, 244/162, 163, 164, 2, 172

[56] References Cited

U.S. PATENT DOCUMENTS

| | | | |
|---|---|---|---|
| 211,915 | 8/1968 | Raymes et al. | D71/1 |
| 3,276,722 | 10/1966 | Eggers, Jr. et al. | 244/1 |
| 3,286,951 | 11/1966 | Kendall | 244/160 |
| 3,301,507 | 1/1967 | Mayo et al. | 244/1 |
| 3,369,771 | 2/1968 | Walley et al. | 244/162 |
| 3,484,826 | 12/1969 | McCarthy, Jr. | 244/1 |
| 3,570,789 | 3/1971 | Rainey | 244/90 |
| 3,606,212 | 9/1971 | Paive | 244/160 |
| 3,698,659 | 10/1972 | Blackstock | 244/1 SS |

OTHER PUBLICATIONS

"Orbital Transfer Vehicle (OTV) Concept Study" vol. 3, Mar. 1981 Report No. GDC-ASD-80-012.
Davis, C. B. & Park, C. "Aerodynamic Charac. of Generalized Bent Biconic Bodies . . . ", Journal of Spacecraft and Rockets, vol. 22 #2, Mar.-Apr. 1985.
Mayo et al., "Newtonian Aerodynamics for blunted Raked-Off Circular Cones and Rake-off Elliptical Cones" NASA TN D-2624 May 1964.
Walberg, "A Survey of Aeroassisted Orbit Transfer" paper 82-1378 of AlAA 9th Atmusphenz Fholf Mechanics Conf. Aug. 9-11 1982.
Scott et al. "An AOTV Aeroheating and Thermal Protection Study" AIAA Paper No. 84-1710, AIAA 19th Thermophysics Conf. Jun. 25-28, 1984.
Vinopal "Aeroassisted Orbital Transfer Vehicle Sys. Tech. Study" vol. 1 Part B-D 180-29222-1, 1985.

*Primary Examiner*—Galen Barefoot
*Attorney, Agent, or Firm*—Russell E. Schlorff; John R. Manning; Edward K. Fein

[57] ABSTRACT

An aerobraking orbital transfer vehicle which includes an aerobraking device which also serves as a heat shield in the shape of a raked-off elliptic or circular cone with a circular or elliptical base, and with an ellipsoid or other blunt shape nose. The aerobraking device is fitted with a toroid-like skirt and is integral with the support structure of the propulsion system and other systems of the space vehicle. The vehicle is intended to be transported in components to a space station in lower earth orbit where it is assembled for use as a transportation system from low earth orbit to geosynchronous earth orbit and return. Conventional guidance means are included for autonomous flight.

15 Claims, 4 Drawing Sheets

AEROBRAKING ORBITAL TRANSFER VEHICLE

The invention described herein was made by employees of the U.S. Government and may be manufactured and used by or for the Government of the United States of America for governmental purposes without the payment of any royalties thereon or therefor.

CROSS REFERENCES TO RELATED APPLICATIONS

This application is a continuation of application Ser. No. 06/746,162, filed 6/18/85, now abandoned.

BACKGROUND OF THE INVENTION

1. Field of the Invention

The present invention relates to an aerobraking orbital transfer vehicle. More specifically, the present invention relates to a vehicle which includes an aerobraking device which also serves as a heat shield in the shape of a raked-off elliptic or circular cone with a circular or elliptical base, and blunted with an ellipsoid or other blunt shape. The aerobraking device is fitted with a toroid-like skirt and forms the basis of the support structure of the propulsion system and other systems of the space vehicle. The vehicle is designed to be space-based, that is, it may be assembled in orbit at a space station and it is not required to be capable of returning to earth. Components will be sized so that they can be brought to the space station in low earth orbit (LEO) from the ground in the Space Shuttle payload bay.

2. Description of Related Art

In the past, space vehicles have utilized aerobraking in order to reduce their relative velocity upon a return to earth. In particular, the Mercury, Gemini, Apollo, and Space Shuttle Orbiter space craft have used aerobraking to great advantage for return to earth with the latter system having achieved this with a reusable thermal protection system. U.S. Pat. No. 3,301,507 discloses a hypersonic reentry vehicle with a heat shield portion in the form of a sharp nosed raked-off cone. However, there is a need for improved space-based reusable vehicles for flight between LEO and geosynchronous earth orbit (GEO) and return.

SUMMARY OF THE INVENTION

Accordingly, it is a primary object of the present invention to provide an aerobraking orbital transfer vehicle which would serve as a cost-effective transportation system to deliver payloads from LEO to GEO and return. When used in such a manner, the vehicle would be assembled in space and be space-based.

It is a further object of the present invention to provide an aerobraking orbital transfer vehicle which has an aerobrake that forms the basis for the support structure for the propulsion system.

It is another object of the present invention to provide a configuration of the aerobraking orbital transfer vehicle which will provide lift at zero angle of attack and minimizes the stagnation point heat flux.

It is an additional object of the invention to provide a heat shield which supports the other subsystems of the vehicle.

The objects of the present invention are fulfilled by providing a space vehicle with an aerobraking device in the shape of a raked-off elliptic or circular cone with a circular or elliptical base, and blunted with an ellipsoid or other blunt shape nose. The blunt nose reduces the stagnation point heat flux and the windward surface heat flux. The vehicle may trim at zero angle of attack with respect to the cone axis, placing the stagnation point on the cone axis and thus on the region of largest radius of curvature of the blunt shaped nose.

The vehicle is fitted with a toroid-like skirt, which may be of circular cross section or other smoothly varying curved cross section. The skirt provides a smooth transition from the conical surface to a surface that is more nearly parallel to the wind velocity. This tends to reduce the heat flux near the trailing edge of the cone.

The structure of the aerobrake is integral with the support structure of the propulsion system and other systems of the space vehicle. Also, the aerobrake brake is inherently more rigid than a simple cone with no skirt or bluntness.

The windward side of the heat shield structure is covered with thermal protection materials to insulate it from the severe high temperature entry environment resulting from GEO to LEO transit. The thermal protection materials may be either rigid or flexible insulating material, such as used on the Space Shuttle Orbiter. The thermal protection materials may form part of the aerobrake, i.e., they may support aerodynamic loads.

The propulsion system rocket engines do not necessarily thrust along the cone axis, but thrust to the side during the powered flight, allowing freedom to place payloads along the thrust axis while allowing the attitude of the vehicle to present the heat shield blunt face toward the wind direction during atmospheric flight. This direction is that of stable attitude.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
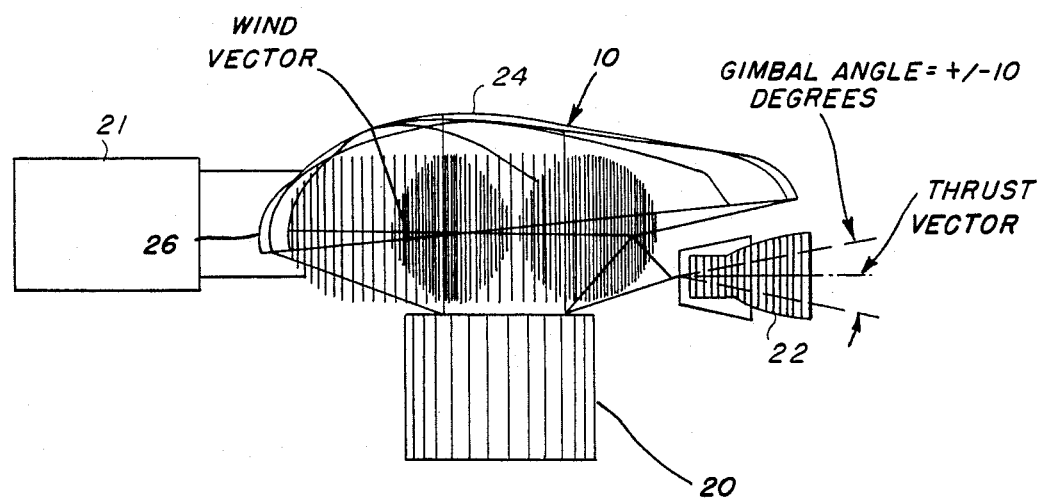
FIG. 1 is a side view of the vehicle of the invention.
Figure 2:
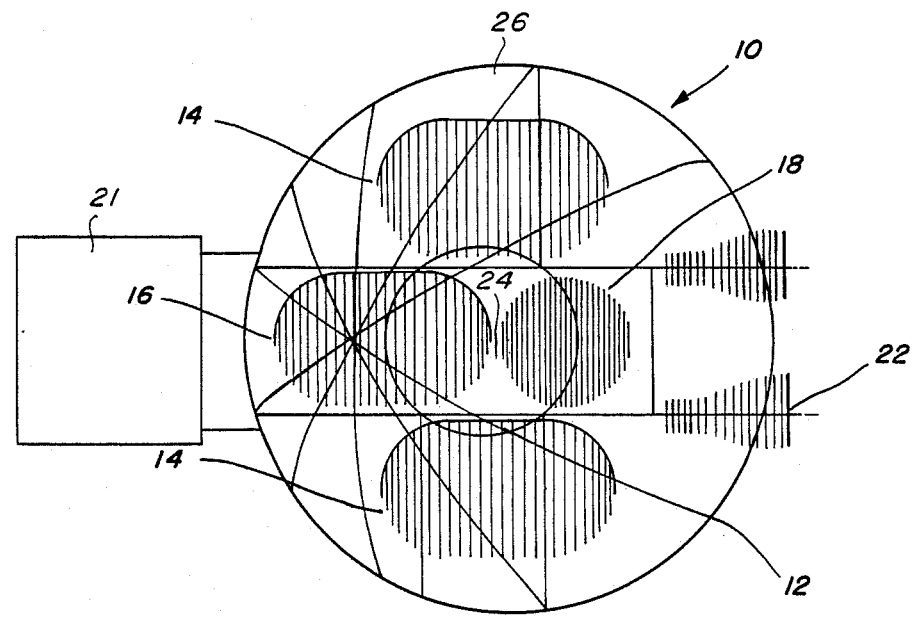
FIG. 2 is a top view of the vehicle of the invention.

Referring in detail to the drawings, there is illustrated in FIGS. 1 and 2, an aerobraking orbital transfer vehicle 10 including an aerobrake which is also the heat shield 12, ascent hydrogen tanks 14, oxygen tank 16, descent hydrogen tank 18, return payload module 20, nonreturn payload module 21 and engines 22. The engines 22 are mounted on gimbals in order to allow the thrust vector to be varied from +10 to −10 degrees as shown in FIG. 1. The engines 22 may be liquid rocket engines, such as RL-10 class engines which use liquid hydrogen and liquid oxygen as fuel. The engines 22 and the tankage therefor are supported by the structure which forms the configuration of the aerobrake 12. Conventional guidance means are provided for autonomous flight.

Figure 4:
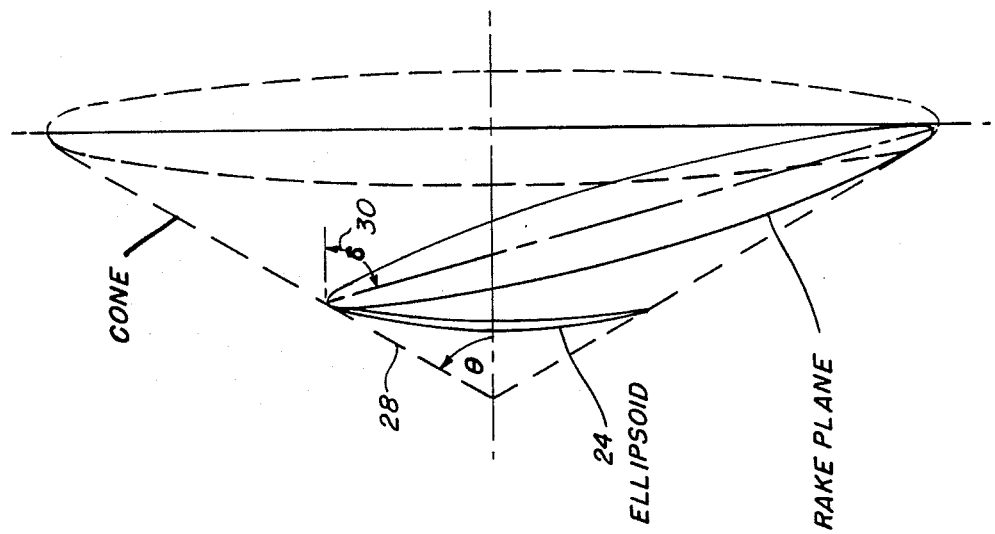
FIG. 4 is an illustration of the geometric construction of the blunted raked-off cone.
Figure 3:
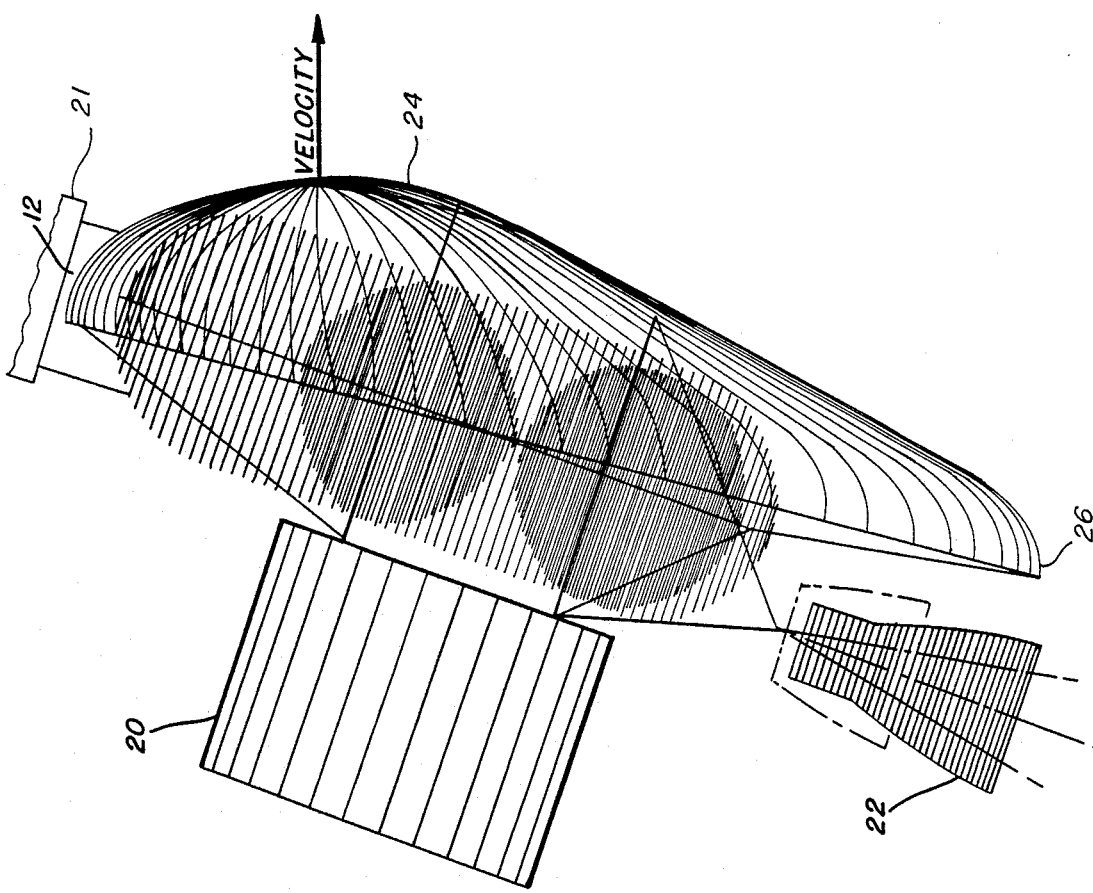
FIG. 3 is a view of the vehicle of the invention in aerobraking attitude.

The heat shield is in the shape of a raked-off elliptic or circular cone with a circular or elliptical base, and is blunted with a nose 24 in the form of an ellipsoid or other blunt shape as shown in FIG. 4. The particular cone shown is an elliptical 60° cone 28 raked off at an angle of $\delta = 73°$ as shown at 30. The wide cone angle was selected because it has a flatter shape for surface area efficiency and because it provides lower stagnation point heating than sharper cones. The bluntness reduces the stagnation point heat flux and the windward surface heat flux. The ellipsoidal nose 24 tends to provide a more uniform heat flux distribution over the blunted surface. As shown in FIG. 4, the vehicle may trim at zero angle of attack with respect to the cone axis, placing the stagnation point on the cone axis and thus on the region of largest radius of curvature of the ellipsoid. The base of the cone (in the rake angle) is circular, thus defining, along with the rake angle and cone angle, the cone ellipticity. A circular base is not required, but may be preferable for packaging reasons.

The heat shield is fitted with a toroid-like skirt 26, which may be of circular cross section or other smoothly varying curved cross section. The skirt provides a smooth transition from the conical surface to a surface that is more parallel to the wind velocity. Also, the heat shield is inherently more rigid than a simple cone with no skirt or bluntness.

Figure 5:
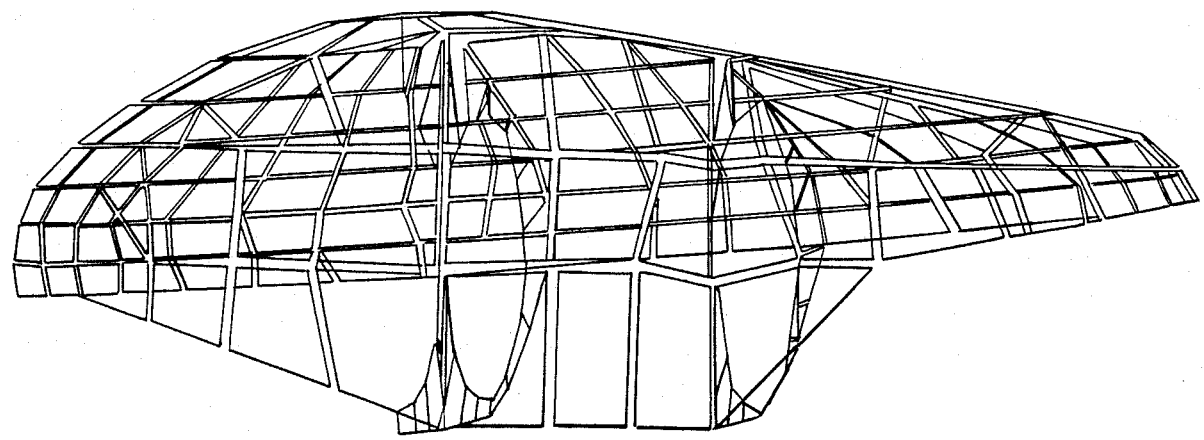
FIG. 5 is a side view of Half-Model of AOTV heat shield structure and bulkheads.

The structure of the heat shield is integral with the support structure of the propulsion system and other systems of the space vehicle as shown in FIGS. 1 and 2. FIG. 5 discloses a particular arrangement of the heat shield structure and bulkheads.

An ellipsoidal bluntness was chosen, which is tangent to the elliptic cone in a planar intersection perpendicular to the cone axis. A bluntness ellipticity (major to minor axis ratio) of 2.0 was chosen because it has a rather uniform heat flux distribution and relatively low stagnation point heat flux.

The Newtonian lift (L) to drag (D) ratio is determined by the rake angle with L/D approximately equal to Cot $\delta$. The desired L/D of 0.3 requires a rake angle of 73° and appears to be sufficient for control of the vehicle during atmospheric flight. This configuration trims at an angle of attack of zero with respect to the cone axis, thus placing the stagnation point on the maximum radius of curvature of the ellipsoid.

Figure 6:
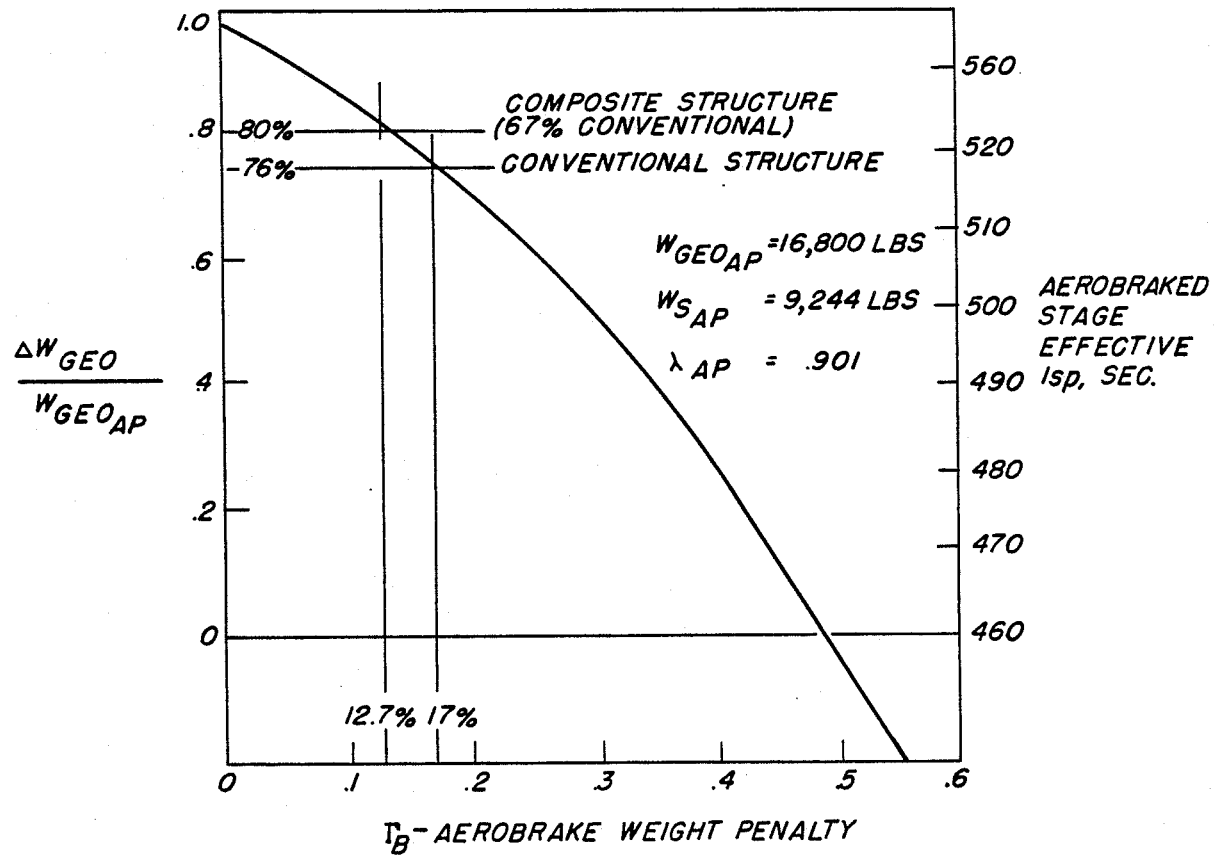
FIG. 6 shows a comparison of an aerobraked stage with a similar all propulsive stage with the same propellant load.
Figure 7:
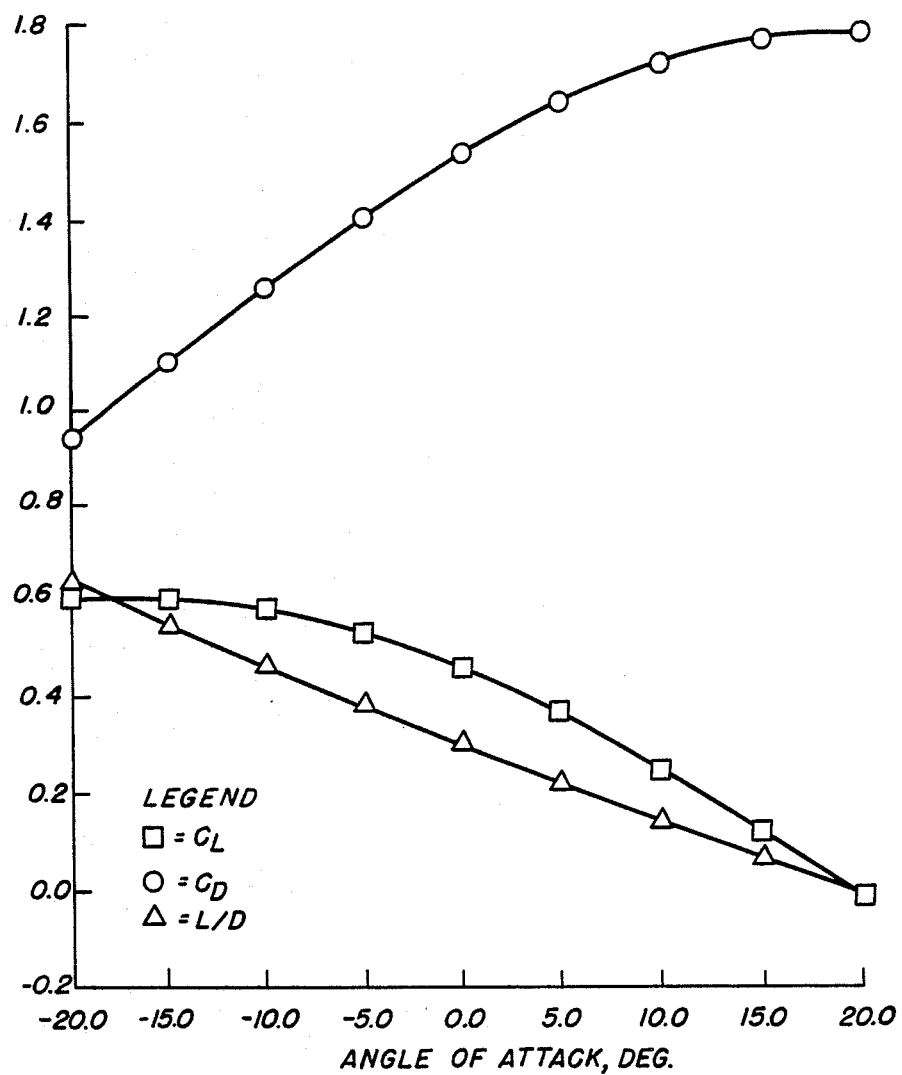
FIG. 7 is a graph showing Newtonian Aerodynamic coefficients of Blunted Raked-Off Cone.

Newtonian aerodynamic characteristics of the aerobrake structure are shown in FIG. 7. At angle of attack $\alpha = 0$ the lift and drag coefficients are 0.45 and 1.53 respectively, resulting in a L/D of 0.296. The change in pitching moment about the midpoint of the rake angle plane is $C_m\alpha = 0.0031$ per degree. The change in yawing moment about the same point due to sideslip angle is $C_n\beta$ 32 0.0033 per degree. These coefficients represent a statically stable vehicle FIG. 6 shows a comparison of the disclosed aerobraked vehicle with a similar all propulsive vehicle with the same propellant load. The left hand ordinate $\Delta W_{GEO}/W_{GEO}$ is a measure of the additional payload delivered to GEO by an aerobraked stage normalized by the GEO payload capability of the identical all propulsive vehicle. The abscissa is the additional weight penalty of the aerobraked stage. The disclosed invention, shown to be at the 17% point, will yield a 76% increase in payload to GEO over the all propulsive vehicle. The approximation for an all composite-material structure will yield an 80% improvement. To compare the aerobraked stage with alternative technologies, the right hand ordinate is an indication of the specific impulse $I_{SP}$ required of an all propulsive stage to achieve the same improvement. An $I_{SP}$ of 515 lbf-sec/lbm would be required in order for an all propulsive stage to make the same GEO delivery and return or, looking at the comparison in a different way, the aerobrake is equivalent to a 55 lbf-sec/lbm increase in specific impulse.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A reusable, spaced-based, aerobraking orbital transfer vehicle, said vehicle including a structure formed of bulkheads and stringers, the external configuration of said structure being in the shape of a raked-off, wide angle cone with a blunted nose and a toroid-like skirt about the base of the cone to form an aerobrake providing drag and lift for said vehicle, the blunted nose reduces the stagnation point heat flux and the windward surface heat flux, the skirt provides a smooth transition from the conical surface to a surface that is more nearly parallel to the wind velocity reducing the heat flux near the trailing edge of the cone, the external surface of the aerobrake being covered with a material that will provide reuseable thermal protection during excursions of the vehicle into the atmosphere, the structure integrally supporting an ascent/descent propulsion system, the tankage therefor and other systems of said vehicle, the thrust vector of the propulsion system being approximately normal to an axis extending through the base of the cone.

2. The aerobraking orbital transfer vehicle as set forth in claim 1 including support structure and attachment means integral with said structure for at least one payload module.

3. The aerobraking orbital transfer vehicle as set forth in claim 2 in which the payload module is attached aft of the aerobrake.

4. The aerobraking orbital transfer vehicle opposite the propulsion system in a position so that the thrust vector of the propulsion system is approximately in line therewith.

5. The aerobraking orbital transfer vehicle as claimed in claim 1 in which said cone is an elliptic cone.

6. The aerobraking orbital transfer vehicle as claimed in claim 1 in which said cone is a circular cone.

7. The aerobraking orbital transfer vehicle as claimed in claim 1 in which the blunted nose is an ellipsoid.

8. The aerobraking orbital transfer vehicle as set forth in claim 1 in which the propulsion system includes at least one rocket engine utilizing hydrogen and oxygen as fuel and the tankage for the hydrogen and the oxygen.

9. The aerobraking orbital transfer vehicle set forth in claim 8 in which there is a separate tank for the hydrogen required for descent.

10. A reusable, spaced-based, aerobraking orbital transfer vehicle, said vehicle including a structure formed of bulkheads and stringers, the external configuration of said structure being in the shape of a raked-off, wide angle, cone with a blunted nose and a toroid-like skirt about the base of the cone to form an aerobrake providing drag and lift for said vehicle, the blunted nose reduces the stagnation point head flux and the windward surface heat flux, the skirt provides a smooth transition from the conical surface to a surface that is more nearly parallel to the wind velocity reducing the heat flux near the trailing edge of the cone, the external surface of the aerobrake being covered with a material that will provide reuseable thermal protection during excursions of the vehicle into the atmosphere, the structure integrally supporting an ascent/descent propulsion system, the tankage therefor and other systems of said vehicle, and support structure and attachment means for a payload module positioned aft of and protected by the aerobrake.

11. The aerobraking orbital transfer vehicle as set forth in claim 10 in which said cone is elliptical.

12. The aerobraking orbital transfer vehicle as set forth in claim 10 in which said cone is circular.

13. The aerobraking orbital transfer vehicle as set forth in claim 10 in which the blunted is nose is an ellipsoid.

14. A reusable, spaced-based, aerobraking orbital transfer vehicle, said vehicle including a structure formed of bulkheads and stringers, the external configuration of said structure being in the shape of an elliptical cone with an angle of approximately 60° raked-off at an angle of approximately 73° with an ellipsoidal nose and a toroid-like skirt about the base of the cone to form an aerobrake providing lift at zero angle of attack with respect to the cone axis, the ellipsoidal nose minimizing the stagnation point heat flux, the skirt providing a smooth transition from the conical surface to a surface that is more nearly parallel to the wind velocity reducing the heat flux near the trailing edge of the cone, the external surface of the aerobrake being covered with a material that will provide reuseable thermal protection during excursions of the vehicle into the atmosphere, the structure integrally supporting an ascent/descent propulsion system, the tankage therefor and other systems of said vehicle, the thrust vector of the propulsion system being approximately normal to an axis extending through the base of the cone, the structure including integral support structure and attachment for at least one payload module.

15. The aerobraking orbital transfer vehicle as set forth in claim 14 in which the payload module is attached aft of the aerobrake.

* * * * *